United States Patent
Chen et al.

(10) Patent No.: US 12,071,938 B2
(45) Date of Patent: Aug. 27, 2024

(54) SOLAR-POWERED, TEMPERATURE CASCADING SYSTEM FOR ELECTRICITY GENERATION

(71) Applicant: KING ABDULLAH UNIVERSITY OF SCIENCE AND TECHNOLOGY, Thuwal (SA)

(72) Inventors: Qian Chen, Thuwal (SA); Muhammad Wakil Shahzad, Rahim Yar Khan (PK); Muhammad Burhan, Lahore (PK); Doskhan Ybyraiymkul, Almaty (KZ); Faheem Hassan Akhtar, Thuwal (SA); M. Kumja, Thuwal (SA); Kim Choon Ng, Singapore (SG)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 18/021,500

(22) PCT Filed: Aug. 16, 2021

(86) PCT No.: PCT/IB2021/057524
§ 371 (c)(1),
(2) Date: Feb. 15, 2023

(87) PCT Pub. No.: WO2022/038487
PCT Pub. Date: Feb. 24, 2022

(65) Prior Publication Data
US 2023/0296087 A1    Sep. 21, 2023

Related U.S. Application Data

(60) Provisional application No. 63/067,621, filed on Aug. 19, 2020.

(51) Int. Cl.
*F03G 6/06* (2006.01)
*F03G 6/00* (2006.01)
(Continued)

(52) U.S. Cl.
CPC ............. *F03G 6/065* (2013.01); *F03G 6/098* (2021.08); *F24S 23/70* (2018.05); *F24S 60/00* (2018.05);
(Continued)

(58) Field of Classification Search
CPC .......... F03G 6/065; F03G 6/098; F03G 6/067; F03G 6/068; F03G 6/071; F03G 6/108;
(Continued)

(56) References Cited

U.S. PATENT DOCUMENTS 4,081,024 A * 3/1978 Rush ..................... F24F 5/0046
62/235.1
4,449,515 A  5/1984 Nilsson
(Continued)

FOREIGN PATENT DOCUMENTS

CN    102607187 A   7/2012
DE    102014107804 A1   12/2015
(Continued)

OTHER PUBLICATIONS

Ho, C., et al., "Technology Advancements for Next Generation Falling Particle Receivers," Energy Procedia, 2014, vol. 49, pp. 398-407, Elsevier.
(Continued)

*Primary Examiner* — Hoang M Nguyen
(74) *Attorney, Agent, or Firm* — PATENT PORTFOLIO BUILDERS PLLC

(57) ABSTRACT

A concentrating solar power plant includes a solar light capturing part configured to capture solar light; and a heat exchange part configured to transform solar energy, from the
(Continued)

captured solar light, into heat, which is stored in a solid medium, wherein the solid medium is stored underground. The solar light capturing part has a heliostat farm, a beam down solar concentrator, and a compound concentrator, each configured to reflect the solar light.

20 Claims, 10 Drawing Sheets

(51) Int. Cl.
*F24S 23/70* (2018.01)
*F24S 60/00* (2018.01)

(52) U.S. Cl.
CPC ..... *F05B 2220/301* (2013.01); *F05B 2260/20* (2013.01)

(58) Field of Classification Search
CPC .. F24S 23/70; F24S 60/00; F24S 20/20; F24S 23/79; F24S 80/20; F05B 2220/301; F05B 2260/20; Y02E 10/46; Y02E 60/14; Y02E 70/30; F28D 2020/0021; F28D 20/0056
USPC ................................. 60/641.8, 659
See application file for complete search history.

(56) References Cited

U.S. PATENT DOCUMENTS

| | | | |
|---|---|---|---|
| 5,529,054 A | 6/1996 | Shoen | |
| 5,979,428 A | 11/1999 | Greene, Jr. | |
| 5,979,438 A | 11/1999 | Nakamura | |
| 11,767,950 B2* | 9/2023 | Lewis | F17C 13/06 60/659 |
| 2013/0219892 A1* | 8/2013 | Havel | F02C 1/05 60/659 |
| 2015/0267612 A1* | 9/2015 | Bannari | F02C 6/16 60/659 |
| 2015/0300209 A1* | 10/2015 | Goldman | F01K 3/08 60/659 |
| 2018/0230873 A1* | 8/2018 | Herman | F01M 13/04 |
| 2018/0230973 A1 | 8/2018 | Magaldi et al. | |

FOREIGN PATENT DOCUMENTS

| | | |
|---|---|---|
| FR | 3005498 A1 | 11/2014 |
| WO | 2010083285 A1 | 7/2010 |
| WO | 2011000522 A2 | 1/2011 |
| WO | 2012120016 A1 | 9/2012 |
| WO | 2017021832 A1 | 2/2017 |

OTHER PUBLICATIONS

Ho, C.K., et al., "On-Sun Testing of an Advanced Falling Particle Receiver System," AIP Conference Proceedings, May 31, 2016, pp. 030022-1-030022-8, AIP Publishing LLC.

Ho, C.K., et al., "Performance Evaluation of a High-Temperature Falling Particle Receiver," Energy Sustainability, Jun. 2016, pp. 1-30, American Society of Mechanical Engineers.

International Search Report in corresponding/related International Application No. PCT/IB2021/057524, dated Jan. 12, 2022.

Invitation to Pay Additional Fees and, Where Applicable, Protest Fee in corresponding/related International Application No. PCT/IB2021/057524, date of mailing Nov. 18, 2021.

Mohammadi, K., et al., "Hybrid Concentrated Solar Power (CSP)-Desalination Systems: A Review," Desalination, Aug. 5, 2019, vol. 468, pp. 1-34, Elsevier.

Siegel, N.P., et al., "Development and Evaluation of a Prototype Solid Particle Receiver: On-Sun Testing and Model Validation," Journal of Solar Energy Engineering, May 2010, vol. 132, pp. 021008-1-021008-8.

Written Opinion of the International Searching Authority in corresponding/related International Application No. PCT/IB2021/057524, dated Jan. 12, 2022.

First Substantial Examination Report in corresponding/related Saudi Arabian Application No. 523442593, dated Dec. 12, 2023.

* cited by examiner

SOLAR-POWERED, TEMPERATURE CASCADING SYSTEM FOR ELECTRICITY GENERATION

CROSS-REFERENCE TO RELATED APPLICATIONS

This application is a U.S. National Stage Application of International Application No. PCT/IB2021/057524, filed on Aug. 16, 2021, which claims priority to U.S. Provisional Patent Application No. 63/067,621, filed on Aug. 19, 2020, entitled "SOLAR-POWERED TEMPERATURE CASCADING SYSTEM FOR ELECTRICITY GENERATION AND SEAWATER DESALINATION," the disclosures of which are incorporated herein by reference in their entirety.

BACKGROUND

Technical Field

Embodiments of the subject matter disclosed herein generally relate to a system and method for transforming the solar power into electrical energy, and more particularly, to a cascading system that generates electrical energy from solar power using a solid medium as a heat transfer medium. In one application, the cascading system is also configured to distill water.

Discussion of the Background

Energy supply is one of the greatest challenges faced by human beings. Global energy consumption has exceeded 550 EJ in 2013 and is expected to increase by 70% in 2050. Such a high amount of energy consumption not only heightens the burden of energy supply, but also causes the emissions of greenhouse gases (GHG), such as $CO_2$. Without decisive energy actions, energy-related emissions of $CO_2$ will double by 2050, leading to considerable climate degradation with an average 6° C. global warming. Therefore, sustainable and environmental-friendly energy technologies are crucial to tackle the issues associated with energy crisis and global warming.

Among all the existing renewable energy sources, solar energy is deemed to have the most potential due to its great availability and high technology maturity. According to the prediction of International Energy Agency (IEA), solar power could provide up to 27% of global electricity by 2050, and become the leading source of electricity globally as early as 2040. The concentrating solar power (CSP) plant is one of the most promising solar technologies. Compared with other solar technologies such as photovoltaic (PV), it has many unique features, including (1) the working fluid can also function as heat storage material, enabling counter-clock electricity generation and continuous energy output, and (2) the CSP plants can be equipped with backup from fossil fuels to compensate for the fluctuations of solar intensity and energy demand. These features enable the CSP plants to be detached from the grid and operated independently. In countries with high direct normal irradiance (DNI), the CSP is expected to become a competitive source of bulk power by 2030.

The CSP plants generate the electricity by steam expansion in a turbine. The system is similar to fossil fuel plants with the boiler replaced by solar collectors. To increase the process temperature, the solar radiation is concentrated using an optical system. Depending on the optical technology applied, the process temperature can be larger than 800° C., as compared to 150° C. from the normal flat plate collectors. Such a higher process temperature will promote the efficiency of the power plant. In the past few decades, the CSP has witnessed a robust growth, with a global installed capacity of 4 GW in 2014. However, such a capacity pales in comparison with the PV capacity (150 GW), and more efforts are required to further improve the CSP technologies.

The conventional CSP plant usually employs molten salts as the heat storage material. Their temperature is limited to 600° C., above which the salt fluids will become chemically unstable. To increase the temperature limit, the authors in [1] used solid particles for heat absorption and storage, and the maximum temperature can potentially reach 1000° C. The authors in [2] proposed a CSP plant integrating a falling particle receiver and a solar tower. A falling particle receiver was constructed and tested to verify the concept by the authors in [3, 4]. The maximum particle temperature and thermal efficiency were improved.

However, there are several limitations in these system designs which need to be further improved. Firstly, all the components, including a falling particle receiver, the two particle storage tanks, and a particle-to-working-fluid heat exchanger, are located in a solar tower with a height of about 15 m. Such an elevated system not only has a high design complexity and initial costs, but also adds to the operation and maintenance complexity. Secondly, there is a lack of design details for the power plant to be used with the falling particle receiver. Conventional CSP plants typically employ a steam turbine due to the temperature limitation. However, the falling particle receiver allows to heat a fluid working medium to a higher temperature, and thus, the steam turbine by itself may be inefficient.

Thus, there is a need for a new system that takes advantage of the high temperature achieved by the solid medium used to store the thermal energy and also lowers the complexity and cost of the system.

BRIEF SUMMARY OF THE INVENTION

According to an embodiment, there is a concentrating solar power plant that includes a solar light capturing part configured to capture solar light and a heat exchange part configured to transform solar energy, from the captured solar light, into heat, which is stored in a solid medium, wherein the solid medium is stored underground. The solar light capturing part has a heliostat farm, a beam down solar concentrator, and a compound concentrator, each configured to reflect the solar light.

According to another embodiment, there is a concentrating solar power plant including a solar light capturing part configured to capture solar light, and a heat exchange part configured to transform solar energy, from the captured solar light, into heat, which is stored in a solid medium, wherein the solid medium is stored underground. The heat exchange part includes a solid medium bowl that receives the solid medium and the solar light simultaneously, so that the heat from the solar light is directly transferred to the solid medium. The heat exchange part further includes an underground storage tank configured to store the heated solid medium.

According to yet another embodiment, there is a method for generating electrical energy from solar power, and the method includes capturing solar light with a solar light capturing part, heating a solid medium with the solar light, wherein the solid medium is stored underground, in a storage tank of a heat exchange part, spreading the heat uniformly in the solid medium by moving the solid medium from a bottom of the storage tank to a top of the storage tank with a conveyor system, transferring the heat from the solid medium to a liquid that flows through a coil located in the storage tank, boiling water in a boiler, based on the heated liquid, and generating the electrical energy with a turbine based on steam obtained by boiling the water.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
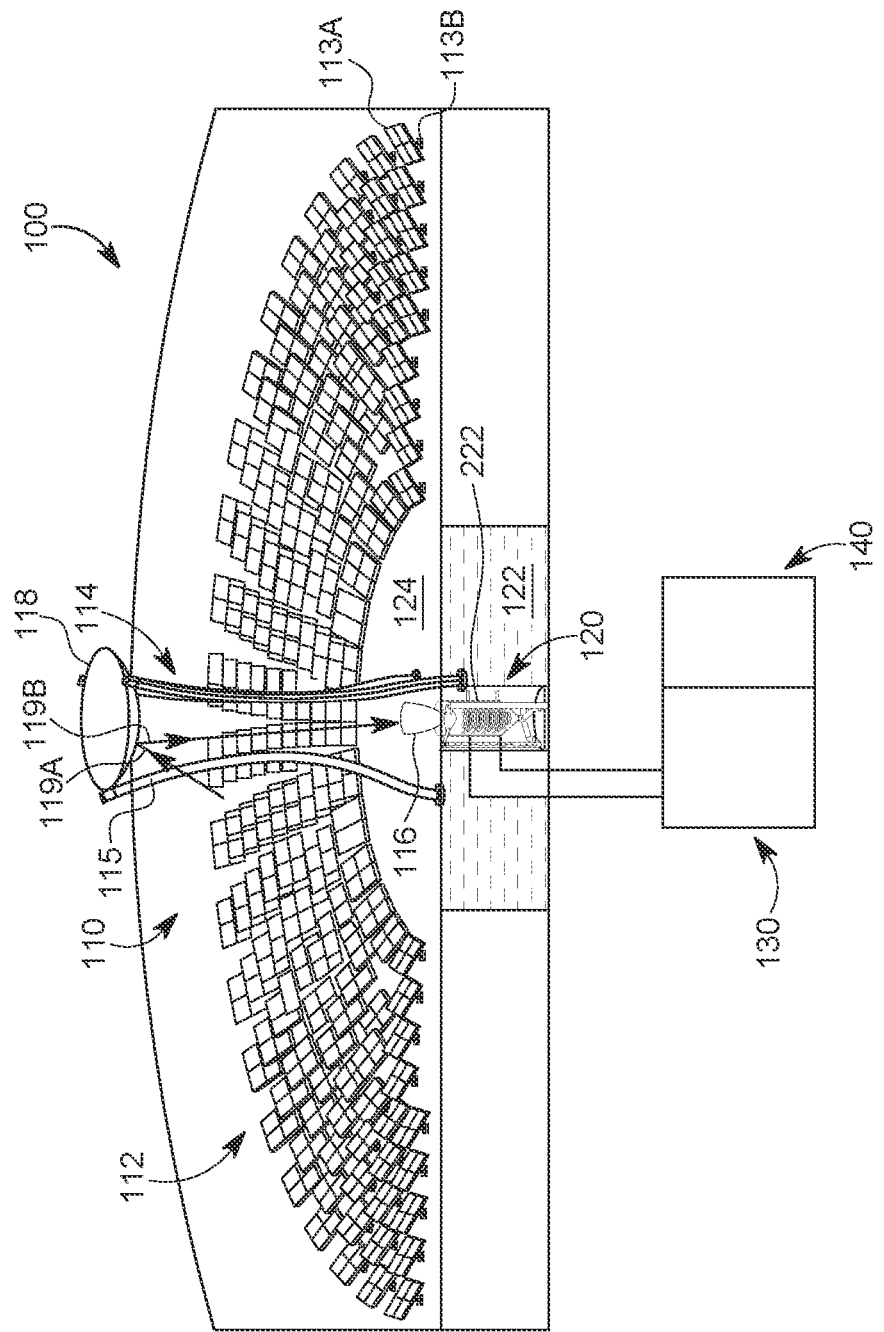
FIG. 1 is a schematic diagram of a concentrating solar power plant that uses solar energy to generate electrical energy and distill water.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a CSP plant having a three-screw solid medium conveyor system. However, the embodiments to be discussed next are not limited to such a conveying system but may be applied to other conveying systems.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel CSP plant includes a tower that holds only a beam down solar concentrator and all the other equipment is located on the ground or underground. The beam down solar concentrator is configured to receive solar light reflected from one or more ground solar reflectors (e.g., a flat mirror), and the received solar light is reflected for a second time, on a convex mirror, toward a compound concentrator located on the ground. The compound concentrator may be internally shaped to have a parabolic profile and is configured to reflect for a third time the solar light, toward a solid medium stored in a solid medium storage tank. The solid medium storage tank is deployed underground, for preserving the heat collected by the solid medium from the sun light. A conveyor system is connected to the storage tank to circulate the solid medium through the storage tank to distribute the heat uniformly though the solid medium. A coil system is located in the storage tank and is configured to facilitate a heat exchange between the solid medium and a fluid medium that circulates though the coil system. The fluid medium is then used to generate steam, which is used to drive one or more pressure turbines to generate electricity and/or directly contact a spray evaporator/condenser system for obtaining distillate from seawater. This cascade arrangement is very energy efficient, cost effective, and does not require any complex part to be suspended above ground.

An example of a novel CSP plant 100 is now discussed with regard to FIGS. 1-6. The CSP plant 100 includes a solar light capturing part 110, a heat exchange part 120, a power generation part 130, and a water distillation part 140. The power generation part 130 and the water distillation part 140 are illustrated in more detail in FIG. 3. Returning to FIG. 1, the solar light capturing part 110 includes a heliostat farm 112, a tower 114 formed by one or more poles 115 (three are shown in the figure, but more or less poles may be used), a beam down solar concentrator 118 located on top of the tower 114, and a compound concentrator 116 located on the ground, under the compound concentrator 118.

Figure 2:
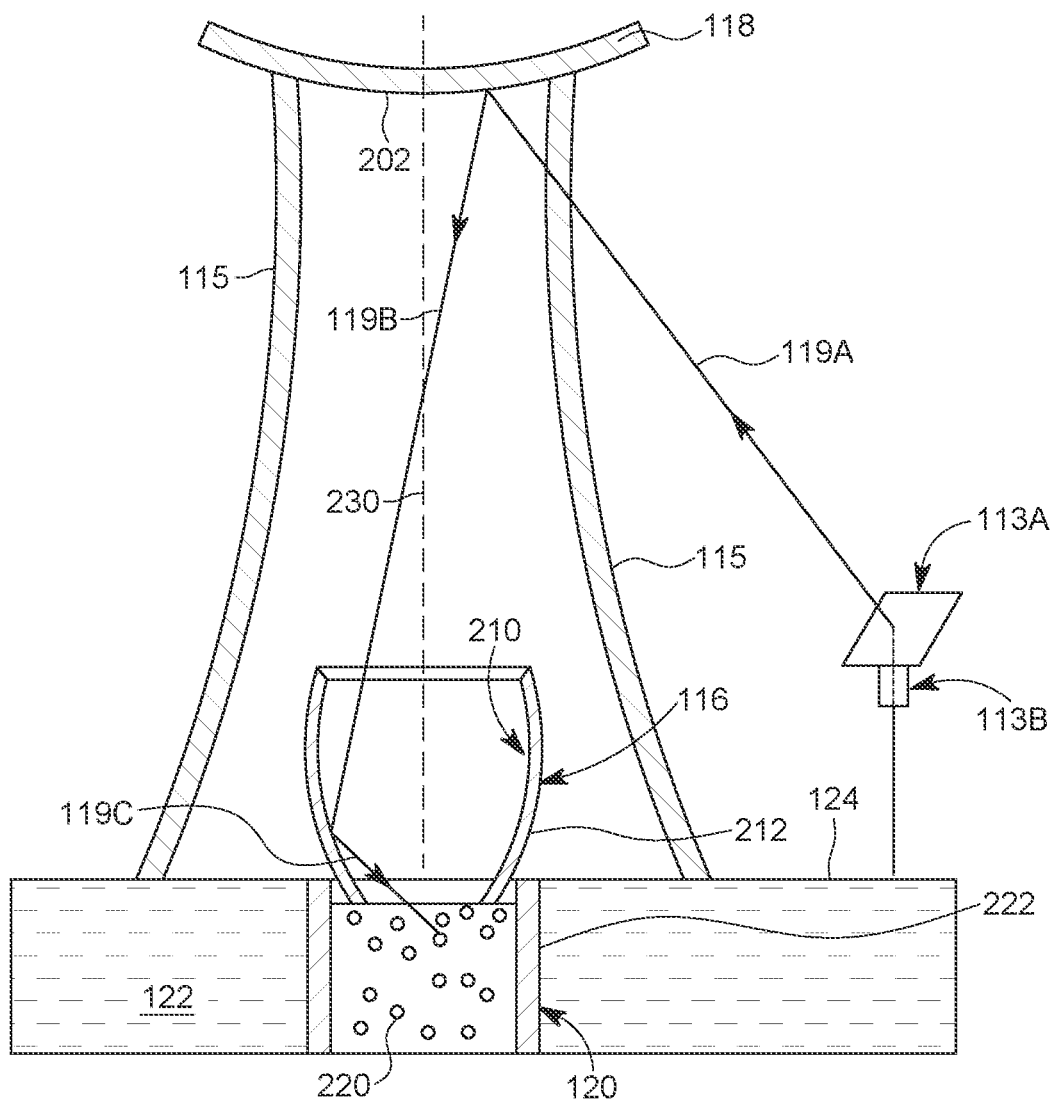
FIG. 2 shows a solar light capturing part and a heat exchange part of the concentrating solar power plant.

The heliostat farm 112 includes plural mirrors 113A (usually flat mirrors, but other curved profiles may be used) supported by corresponding rotation mechanisms 113B, which are configured to rotate the mirrors to reflect the incoming solar lights to the beam down solar concentrator 118 as the sun moves during the day. The beam down solar concentrator 118 is shaped to reflect the incoming light beam 119A, which is reflected from a mirror 113A, toward the compound concentrator 116, as illustrated by the light beam 119B. The surface 202 of the beam down solar concentrator 118, which directly faces the ground, is a convex mirror in one embodiment. The light beam 119B is then again reflected, as shown in FIG. 2, on the interior surface 210 of the compound concentrator 116, so that the third reflected light beam 119C is directed toward the solid medium 220, which is stored in the storage vessel 222 of the heat exchange part 120.

The compound concentrator 116 is centered in this embodiment along a vertical line 230, which is perpendicular to the earth's surface 124, and is also central to the beam down solar concentrator 118. By locating the compound concentrator 116 at the entrance of the solid medium storage vessel 222 makes the compound concentrator to act as a black-box, i.e., a device that absorbs all the incoming light and loses almost no energy. In one experiment, only less than 2% of all the incoming light was lost by the compound concentrator, everything else was directed to the storage vessel 222. The interior surface 210 of the compound concentrator is kept clean by a top glass cover. The light beam 119C heats the solid medium 220 up to 1700° C. In one application, the solid medium 220 is sand, for example, black volcanic sand. Other granular solid materials may be used as the solid medium 220. Note that the storage vessel 222 is located at least partially in the ground 122, under the earth's surface 124. In one embodiment, the storage vessel 222 may be fully located under the earth's surface 124. For this case, a wall 212 of the compound concentrator 116 may partially enter into the ground 122 to directly communicate with the interior of the storage vessel 222. Thus, the compound concentrator 116 acts as a cap of the storage tank 222, and this "cap" only allows light to enter inside the storage tank.

Figure 3:
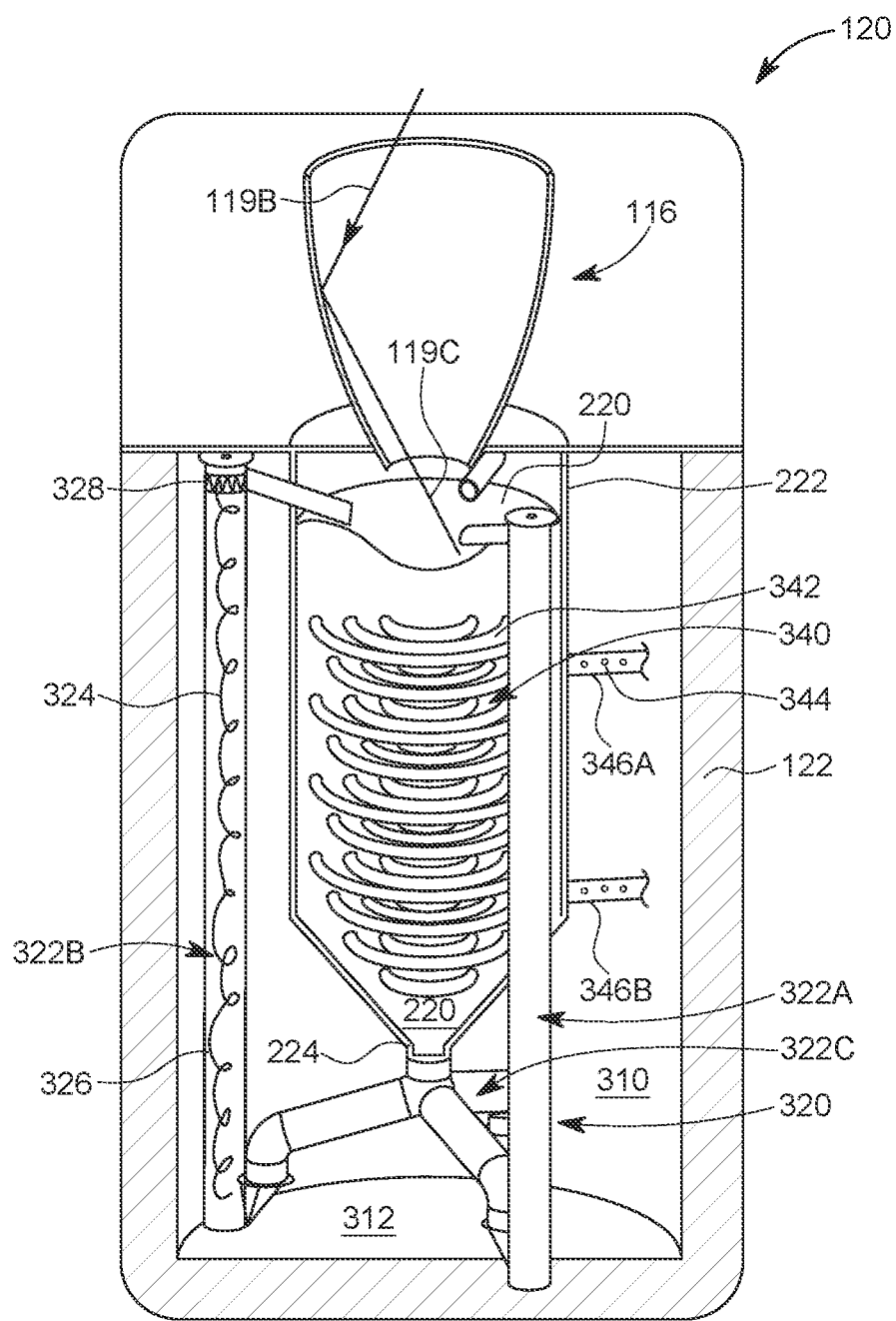
FIG. 3 shows the heat exchange part of the concentrating solar power plant.

FIG. 3 shows in more detail the heat exchange part 120 and the corresponding storage vessel 222 being buried into the ground 122. As shown in this figure, there may be a chamber or hole 310 made into the ground 122, and the storage vessel 122 is placed in this chamber. In addition, a conveyor system 320 is also placed in the chamber 310, around the exterior of the storage tank 222. The conveyor system 320 has in this embodiment three screw mechanisms 322A to 322C, which are placed onto the floor 312 of the chamber 310. Each of the three screw mechanisms 322A to 322C include a tube 324 that extends vertically into the chamber 310. The tube 324 is fluidly connected to a bottom part 224 of the storage tank 222. The bottom part 224 may be shaped as a funnel to direct the solid medium 220 to the bottom of the tube 324. Note that the bottom part 224 is suspended in this embodiment from the floor 312 of the chamber 310. A screw 326, which is located inside the tube 324, is configured to rotate inside the tube, due to an electrical motor 328, and this rotation takes the solid medium 220 from the bottom part 224 of the storage tank 222 and brings it to the top part of the storage tank, to continuously circulate the solid medium through the storage tank. For this reason, the top of each tube 324 is fluidly connected to the top of the storage tank. In this way, the top solid medium 220, which is directly heated by the solar light 119C, moves down the storage tank 220, enters the tube 324, and then is brought back to the top of the storage tank. Therefore, the solid medium 220 will have a constant high temperature due to this process and will store the solar energy from the incoming solar light.

Figure 4:
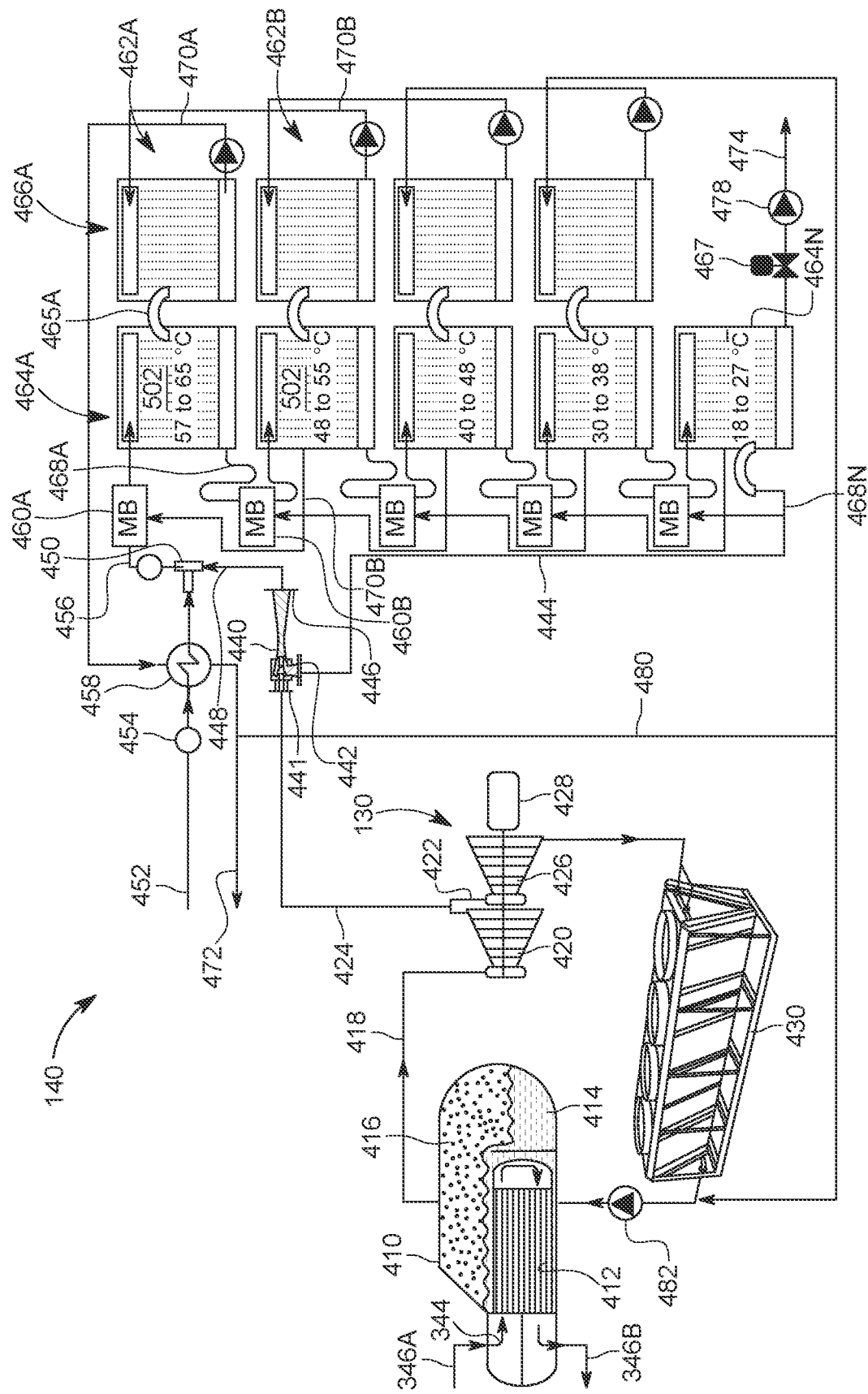
FIG. 4 shows a power generation part and a water distillation part of the concentrating power plant.

A heat exchange system 340, which includes plural tubes or coils 342, is located inside the storage tank 222, and the solid medium 220 directly contacts the plural tubes 342. A fluid 344, which circulates through the heat exchange system 340 is configured to receive the heat stored by the solid medium 220 and take it to a boiler 410, as shown in FIG. 4. FIG. 3 shows the input and output pipes 346A and 346B that fluidly connect the heat exchange system 340 to the boiler 410 in FIG. 4. The heated fluid 344, which may be oil, is heated at about 250° C. when entering the boiler 410. After entering through a plurality of pipes or channels 412, which are externally in direct contact with water 414, the high temperature of the fluid 344 boils the water 414, creating steam 416. The steam 416 may have a temperature of about 180° C. and a pressure of about 10 Bar. The steam 416 is directed by an input pipe 418 to a high-pressure turbine 420, which is part of the power generation part 130. In fact, the boiler 410 and associated piping is also part of the power generation part 130. The steam exiting the high-pressure turbine 420 is split into two streams 422 and 424, having a temperature of about 110° C., and a pressure of about 1.5 bar. The first stream 422 is supplied to a low-pressure turbine 426, which together with the high-pressure turbine 420 rotate the core of a generator 428, thus generating electrical power. The output from the low-pressure turbine 426 is supplied to an air cool condenser 430, to cool down the stream, after which the cold stream is supplied as fresh water at the input to the boiler 410 and the process is repeated.

The second stream 424 is supplied to the water distillation part 140, and more specifically, to a thermal vapor compressor (TVC) ejector 440. The TVC-ejector 440 uses at a first input 441, the second stream 424 as the motive force to generate vacuum at a second input 442, which is connected to a cold stream 444, which is discussed later. The output 446 of the TVC-ejector 440 generates a steam stream 448 at about 70° C. The steam stream 448 is supplied to a first input of a water TVC ejector 450, while a second input of the water TVC ejector 450 receives seawater 452 (at about 30° C.). The seawater 452 may be de-aerated into a de-aeration tank and also passes a valve 454 prior to be being supplied to the second input of the water TVC ejector 450. The seawater 452 may be supplied to the second input with a pressure of about 25 kPa. A heat exchanger 458 may also be placed along the path of the seawater 452, to increase its temperature by heat exchange with the generated distillate, which is discussed later.

Figure 5:
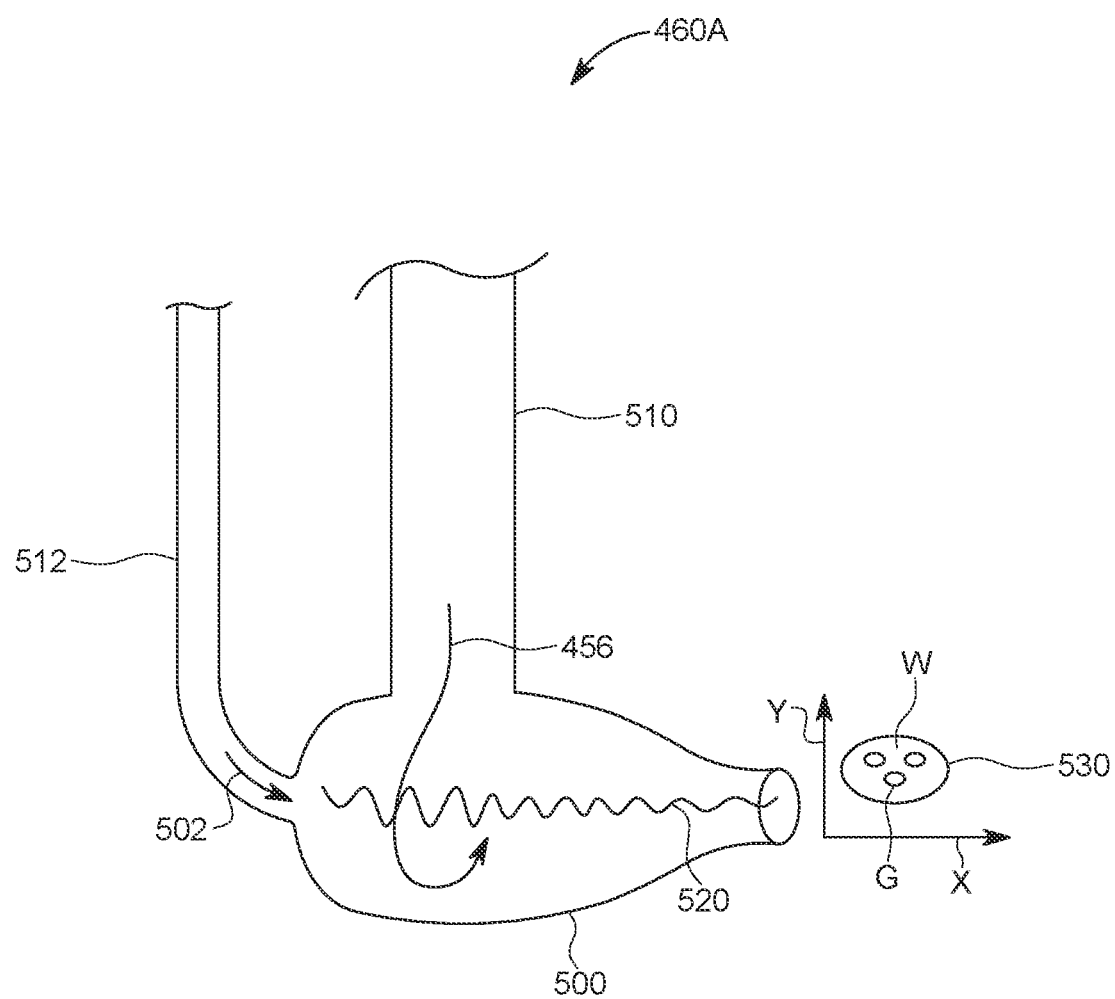
FIG. 5 shows a micro-bubble generator that is used by the water distillation part for obtaining the distillate.

The output stream of seawater 456 from the water TVC ejector 450 is then provided to a micro-bubble generator 460A, at a first cycle 462A of the direct contact spray evaporator condenser (DCSEC) 464. The DCSEC 464 has plural cycles 462I, each cycle including a corresponding micro-bubble generator, an evaporator 464A, and a condenser 466A. FIG. 4 shows that a vapor can move between the evaporator 464A and the condenser 466A through a channel or hole 465A formed between the two chambers. The micro-bubble generator 460A, an example of which is illustrated in FIG. 5, has a main body 500 which is configured to receive, along a longitudinal axis x, a stream of vapors 502, and along a perpendicular axis y, the seawater stream 456. The stream of vapors 502 is provided along a first narrow pipe 512 while the seawater stream 456 is provided along a large pipe 510. The vapors 502 and the water 456 mix together in a swirling way 520, which generates the micro-bubbles 530, which is nothing else than a mixture of water W and gas G. The size of the gas bubbles is about 5-10 µm, while the size of the bubble 530 is about 100 to 150 µm or smaller. In this way, the micro-bubble 530 is more prone to the evaporation process taking place in evaporator 464A.

The micro-bubbles 530 are injected in this embodiment, in FIG. 4, at the top of the evaporator 464A. As they fall toward the bottom of the evaporator, vapors are formed and the vapors transition to the condenser 466A while the water falls to the bottom, where it forms the water stream 468A, which is routed to the micro-bubble generator 460B of the next cycle 462B, and the process repeats itself. Note that part of the vapor 502 in the second cycle 462B is used as input by the previous micro-bubble generator 460A, as illustrated in FIG. 4. Returning to the first cycle 462A, the incoming vapor 502 in the condenser 466A is condensed into fresh water 470A and sent to a distillate collection port 472, through the heat exchanger 458. The fresh water 470B from the second cycle 462B is sent to the top of the condenser 466A, as also shown in FIG. 4, to help in the condensation of the vapor 502 received from the evaporator 464A. FIG. 4 shows that the temperature of the vapor in each evaporator decreases as the number of cycles is increasing.

For the last evaporator 464N, where N can be any integer larger than 2, there is no corresponding condenser and its steam stream 468N is routed as the cold stream 444 to the inlet 442 of the TVC ejector 440 and also to the micro-bubble ejector of the previous stage. The brine 474 from the last evaporator 464N is then discharged outside the system 100, through a valve 476, by a pump 478. Note that part of the distillate 470A is returned through a pipe 480 to the last condenser in the DCSEC 464, and another part is supplied to the pump 482, which supplies the fresh water to the boiler 418.

Figure 6:
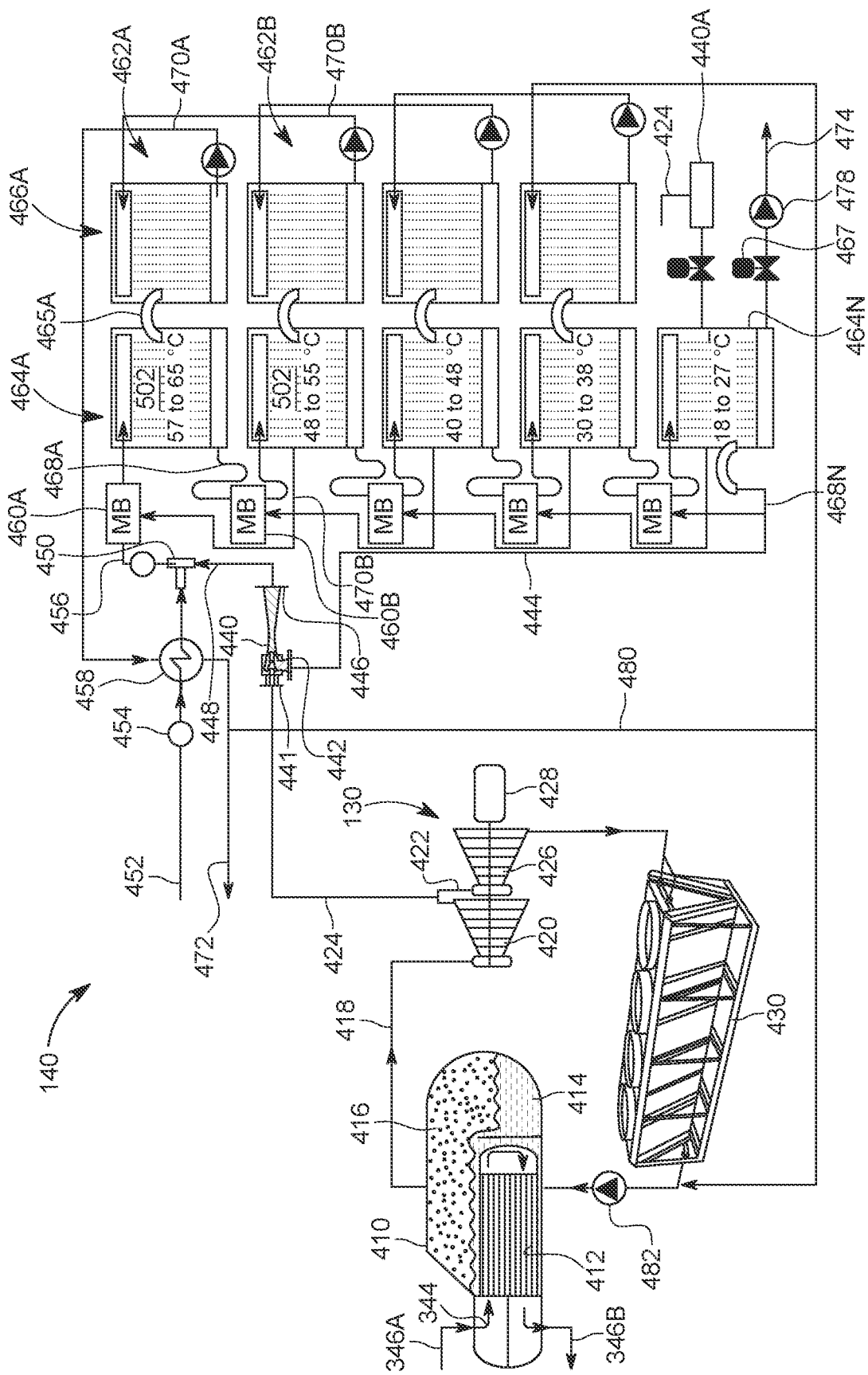
FIG. 6 shows a variation of the power generation part and the water distillation part of the concentrating power plant.

In another embodiment, as illustrated in FIG. 6, the water distillation part 140 is modified to include a second TVC-injector 440A, which is fluidly connected to the interior of the last evaporator 464N, to generate vacuum. Part of the hot stream 424 from the high-pressure turbine 420 is provided to the input of the TVC-injector 440A for generating the vacuum. This configuration improves the efficiency of the water distillation part 140.

Figure 7A:
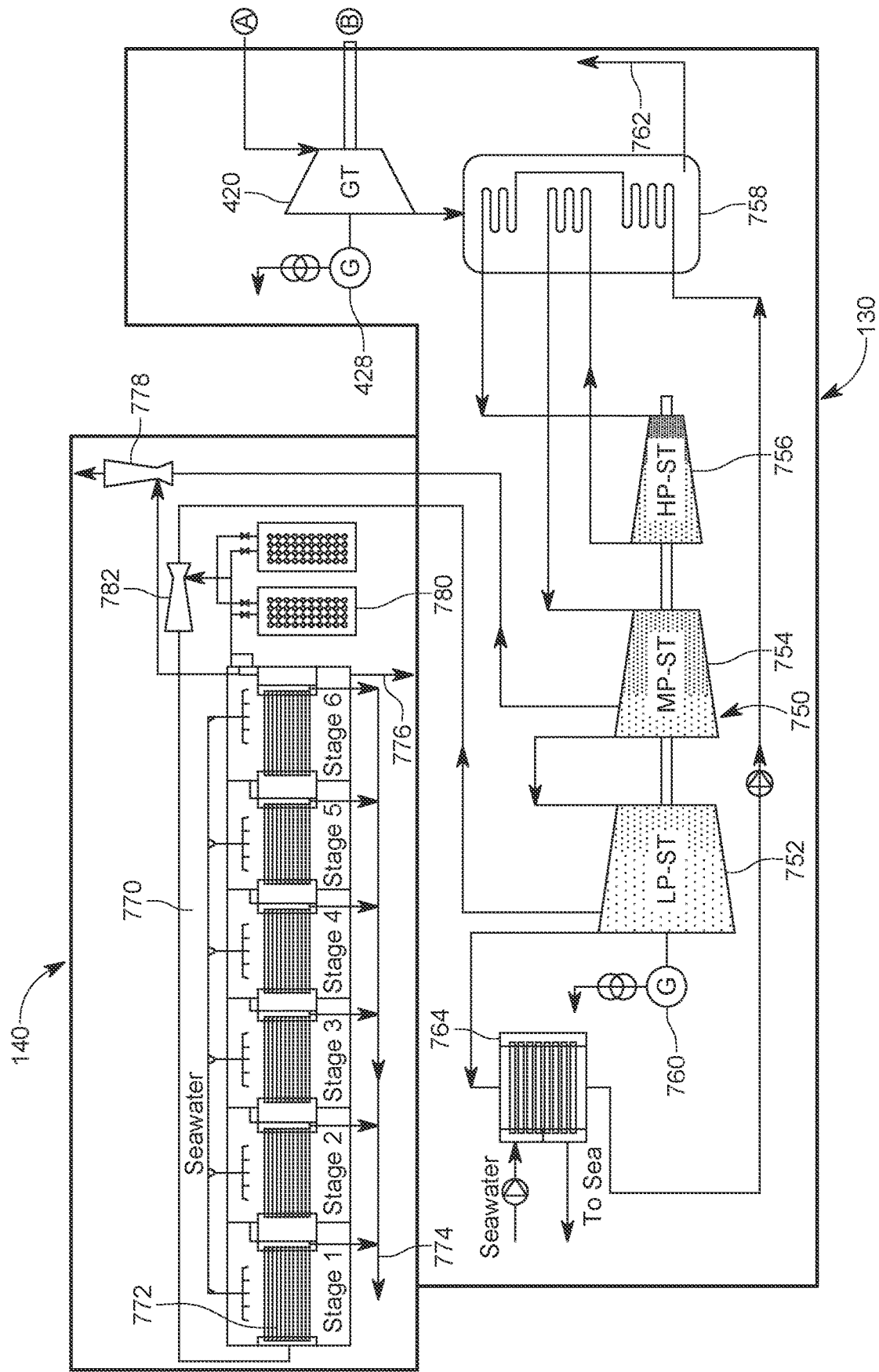
FIGS. 7A and 7B are schematic diagrams of another concentrating solar power plant that uses solar energy to generate electrical energy and distill water.
Figure 7B:
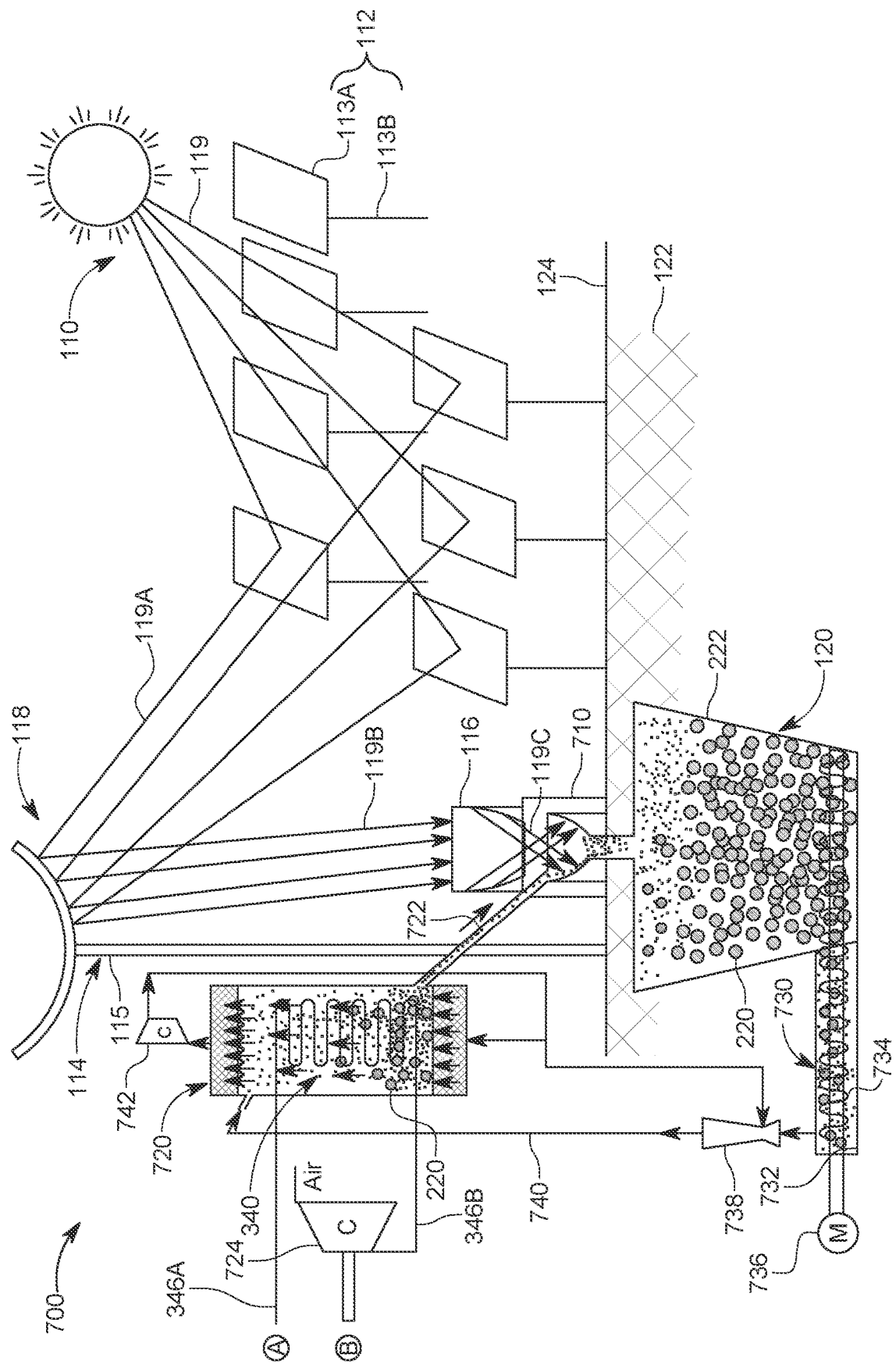

The CSP plant shown in FIGS. 1-6 can be implemented differently, as now discussed with regard to FIGS. 7A and 7B. The CSP plant 700 in FIGS. 7A and 7B has the same main parts, i.e., the solar light capturing part 110, the heat exchange part 120, the power generation part 130, and the water distillation part 140, but some of these parts are implemented differently. In this regard, the solar light capturing part 110 includes the heliostat farm 112, a tower 114 formed by one or more poles 115 (only one is shown in the figure, but more poles may be used), the beam down solar concentrator 118, and the compound concentrator 116. The heliostat farm 112 includes plural mirrors 113A supported by corresponding rotation mechanisms 113B, which are configured to rotate the mirrors to reflect the incoming solar lights to the beam down solar concentrator 118 as the sun moves during the day. The solar light 119 from the sun is thus first reflected on the mirrors 113A, second time reflected on the beam down solar concentrator 118, and third time reflected within the compound concentrator 116. As previously discussed, the interior wall of the compound concentrator 116, which may be a mirror, is shaped to have a parabolic shape. To prevent the accidental entrance of sand or other impurities inside the compound concentrator 116, its top and bottom sides can be covered with glass or other transparent material, to still allow the light rays to pass through, but to prevent any impurity from entering inside the device.

In FIGS. 7A and 7B, the compound concentrator 116 is placed on top of a solid medium bowl 710. The solid medium bowl 710 is configured to receive the solid medium 220 from a fluidized bed air heater 720, along a transport pipe 722. Further, the solid medium bowl 710 is shaped and located to receive the light beams 119C reflected from the walls of the compound concentrator 116. As the solid medium 220 is entering the solid medium bowl 710, the light beams 119C fall upon the solid medium 220, thus heating the solid medium. Thus, the solid medium 220 is heated inside the solid medium bowl 710, and then it falls due to the gravity into the storage vessel 222, which is partially or totally located into the ground 122. The fact that the storage vessel 222 is partially or totally located into the ground ensures that the heat stored by the solid medium is conserved and not lost to the environment. Although the figure appears to suggest that the compound concentrator 116 and the solid medium bowl 710 are located off center relative to the tower and the center of the beam down solar concentrator 118, this is not the case. In other words, the compound concentrator 116 and the solid medium bowl 710 are centered along a symmetry axis of the beam down solar concentrator 118 and/or tower 114.

The solid medium 220 is continuously, or from time to time, moved with a conveyor system 730 outside the storage vessel 222, still under the earth's surface 124, as shown in the figure. In this embodiment, the solid medium is moved parallel to the earth's surface 124, away from the storage vessel 222. The conveyor system 730 may include a tube 732 that holds a screw member 734. The screw member 734 is rotated by an electrical motor 736 and thus, the screw member removes the solid medium from the storage tank and brings it to the other end of the tube 732. At this end, there is a sand ejector device 738, which is driven by compressed air, and the sand ejector device removes the solid medium from the tube 732 and moves it upwards, along a vertical tube 740, into the fluidized bed air heater 720. The fluidized bed air heater 720 is fluidly connected to an air compressor 742, which provides the compressed air to the sand ejector device 738. In addition, part of the compressed air from the air compressor 742 is supplied to the bottom of the fluidized bed air heater 720, as shown in the figure, to fluidize the solid medium 220 and push it through the fluidized bed air heater 720, into the pipe 722, back to the solid medium bowl 710.

The fluidized bed air heater 720 also includes the heat exchange mechanism 340, which holds a gas (e.g., air) into its coils so that heat from the solid medium 220 is transferred to the gas. The heated gas is then provided to a gas turbine 420, along the output 346A, to generate electricity at a generator 428. A compressor 724 compresses ambient air and forces this air to move through the coils of the heat exchange mechanism 340, inside the fluidized bed air heater 720, to collect the heat from the solid medium. The exhaust gases from the gas turbine 420 are received at a set of steam turbines 750, which are also part of the power generation part 130. The set of steam turbines 750 may include a low-pressure steam turbine 752, a medium-pressure steam turbine 754, and a high-pressure steam turbine 756 connected in series to each other and also to a heat recovery steam generator (HRSG) 758. The HRSG 758 recovers the excess heat from the exhaust gases from the gas turbine 420, and generates steam for the steam turbines 752-756. These steam turbines generate electricity by using a generator 760. In one embodiment, the HRSG 758 has two different and independent coil systems inside for feeding the appropriate steam to the low-, medium-, and high-pressure steam turbine. The connections between these coil systems and the three steam turbines is illustrated in FIGS. 7A and 7B. Exhaust gases from the HRSG 758 is released into the ambient at port 762. Part of the steam stream released by the low-pressure steam turbine 752 is circulated through a cooling system 764, which uses seawater to cool the steam prior to recirculating it through the HRSG 758.

Another part of the steam stream released by the low-pressure steam turbine 752 is provided to the water distillation part 140, which uses a multiple-effect distillation (MED) device 770 for distilling water. The seawater is injected into the MED-device 770 at the top, while the steam stream is provided through interior coils 772 to evaporate water from the seawater. The vapors are collected as distillate 774 while the brine 776 accumulates at the bottom of each stage and is discharged outside the system. A steam stream from the mid-pressure steam turbine 754 is provided to a vacuum ejector 778 for collecting the spent initial steam stream that is run through the coils 772. A pressure-swing adsorption desalination device 780 is also connected to the MED device 770 for assisting with the heat extraction from the original steam stream. A gas ejector 782 may be used to improve the circulation of the low-pressure steam through the coils 772.

Those skilled in the art would understand that various parts of the plants 100 and 700 can be combined or swapped, i.e., the energy generation part 130 of plant 100 may be used for the plant 700 and vice versa. The same is true for the water desalination part 140 of the two plants.

Figure 8:
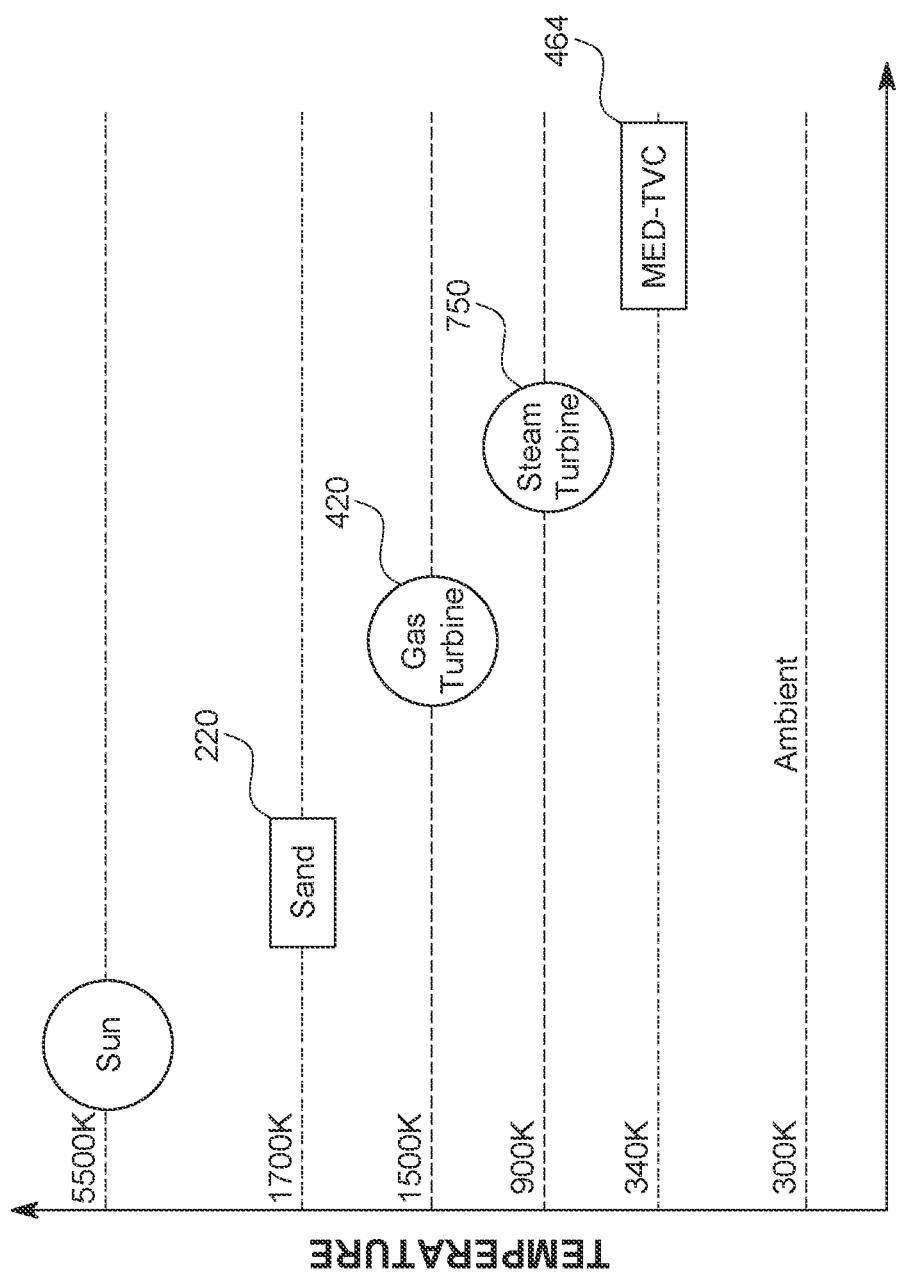
FIG. 8 illustrates how the various parts of the concentrating solar power plant use different temperatures, in a cascade way, to perform their functions.

The temperature cascading in the plants 100 and 700 is illustrated in FIG. 8. It is noted that between the temperature of the sun (5500 K) and the ambient temperature (about 300

K), the collected solar thermal energy is effectively utilized at different temperature levels by different systems of the plants 100 and 700, thus allowing maximum energy utilization and high energy efficiency.

Figure 9:
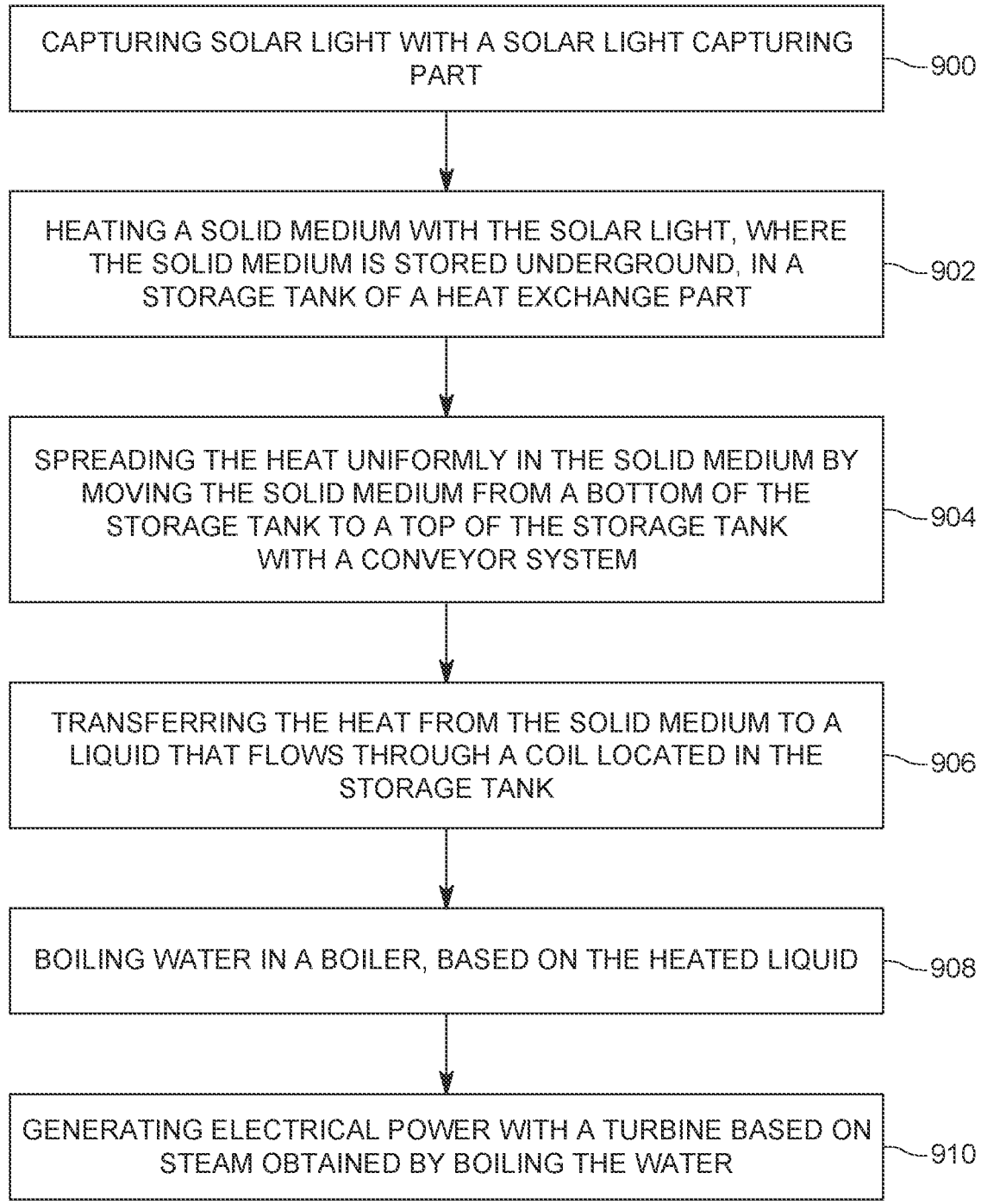
FIG. 9 is a flow chart of a method for distilling water and generating electrical energy with a concentrating solar power plant.

A method for generating electrical energy from solar power, based on the plant 100 or 700, is now discussed with regard to FIG. 9. The method includes a step 900 of capturing solar light with a solar light capturing part, a step 902 of heating a solid medium with the solar light, where the solid medium is stored underground, in a storage tank of a heat exchange part, a step 904 of spreading the heat uniformly in the solid medium by moving the solid medium from a bottom of the storage tank to a top of the storage tank with a conveyor system, a step 906 of transferring the heat from the solid medium to a liquid that flows through a coil located in the storage tank, a step 908 of boiling water in a boiler, based on the heated liquid, and a step 910 of generating electrical power with a turbine based on steam obtained by boiling the water.

The method may further include a step of reflecting with a heliostat farm a first light beam to a beam down solar concentrator located on top of a tower, a step of reflecting with the beam down solar concentrator, which is located on top of a tower, above the heliostat farm, a second light beam, toward a compound concentrator, and a step of reflecting with the compound concentrator, located on the ground, a third light beam toward the solid medium. The second light beam is a reflection of the first light beam, and the third light beam is a reflection of the second light beam. The method may further include a step of using a steam stream from the turbine to drive an ejector and inject seawater into a MED device to distill the water. A last stage or cycle of the MED device is configured to be connected to another ejector, which generates vacuum in the last stage, to move the water stream through all the stages of the MED device. In one embodiment, each stage has a bubble generator that mixes the seawater with steam to increase the evaporation rate inside the evaporator.

The disclosed embodiments provide a temperature-cascading solar cogeneration system that integrates a light concentrator, a solid medium for storing heat, a power generation plant, and a desalination module. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Siegel, N. P., C. K. Ho, S. S. Khalsa, and G. J. Kolb, Development and evaluation of a prototype solid particle receiver: on-sun testing and model validation. Journal of solar energy engineering, 2010. 132(2).

[2] Ho, C., J. Christian, D. Gill, A. Moya, S. Jeter, S. Abdel-Khalik, D. Sadowski, N. Siegel, H. Al-Ansary, and L. Amsbeck, Technology advancements for next generation falling particle receivers. Energy Procedia, 2014. 49(0): p. 398-407.

[3] Ho, C. K., J. M. Christian, J. Yellowhair, N. Siegel, S. Jeter, M. Golob, S. I. Abdel-Khalik, C. Nguyen, and H. Al-Ansary. On-sun testing of an advanced falling particle receiver system. in AIP Conference Proceedings. 2016. AIP Publishing LLC.

[4] Ho, C. K., J. M. Christian, J. Yellowhair, K. Armijo, W. J. Kolb, S. Jeter, M. Golob, and C. Nguyen. Performance evaluation of a high-temperature falling particle receiver. in Energy Sustainability. 2016. American Society of Mechanical Engineers.

What is claimed is:

1. A concentrating solar power plant comprising:
a solar light capturing part configured to capture solar light; and
a heat exchange part configured to transform solar energy, from the captured solar light, into heat, which is stored in a solid medium, wherein the solid medium is stored underground,
wherein the solar light capturing part has a heliostat farm, a beam down solar concentrator, and a compound concentrator, each configured to reflect the solar light so that reflected light from the compound concentrator is directed to the solid medium to directly interact with the solid medium.

2. The plant of claim 1, wherein the captured solar light is reflected by the heliostat farm to the beam down solar concentrator, the beam down solar concentrator is located on top of a tower, above the heliostat farm, the beam down solar concentrator reflects the solar light to the compound concentrator, and the compound concentrator reflects the solar light toward the solid medium.

3. The plant of claim 1, wherein the solid medium is stored in a storage tank, and the storage tank is located underground.

4. The plant of claim 3, wherein the compound concentrator is placed on top and in fluid communication with the storage tank.

5. The plant of claim 3, further comprising:
a conveyor system located underground and in fluid communication with the storage tank,
wherein the conveyor system is configured to circulate the solid medium from a bottom of the storage tank to a top of the storage tank to distribute the heat uniformly.

6. The plant of claim 5, further comprising:
a heat exchanger system partially located inside the storage tank and configured to take the heat from the solid medium and transport the heat to a power generation part.

7. The plant of claim 6, wherein the heat exchanger system has coils located within the storage tank and a fluid that circulates through the coils.

8. The plant of claim 7, further comprising:
the power generation part that is configured to use the heat from the fluid to generate electrical power.

9. The plant of claim 8, wherein the power generation part comprises:
a boiler configured to receive the fluid and generate steam,
a gas turbine configured to receive the steam and drive a generator, and
the generator is configured to generate electricity.

10. The plant of claim 9, further comprising:
a water desalination part configured to use a steam stream from the gas turbine of the power generation part and to desalinate water.

11. The plant of claim 10, wherein the water desalination part includes plural cycles, each cycle including:
a micro-bubble generator for mixing steam and water to form micro-bubbles,
an evaporator that is fed with the micro-bubbles to generate vapors, and
a condenser for condensing the vapors to generate a distillate.

12. The plant of claim 11, wherein the water desalination part includes a final cycle that is connected to a thermal vapor compressor ejector, and the first cycle is also connected to another thermal vapor compressor ejector.

13. A concentrating solar power plant comprising:
a solar light capturing part configured to capture solar light; and
a heat exchange part configured to transform solar energy, from the captured solar light, into heat, which is stored in a solid medium, wherein the solid medium is stored underground,
wherein the heat exchange part includes a solid medium bowl that receives the solid medium and the solar light simultaneously, so that the heat from the solar light is directly transferred to the solid medium, and
wherein the heat exchange part further includes an underground storage tank configured to store the heated solid medium.

14. The plant of claim 13, wherein the solar light capturing part comprises:
a heliostat farm,
a beam down solar concentrator, and
a compound concentrator, each configured to reflect the solar light.

15. The plant of claim 14, wherein the captured solar light is reflected by the heliostat farm to the beam down solar concentrator, the beam down solar concentrator is located on top of a tower, above the heliostat farm, the beam down solar concentrator reflects the solar light to the compound concentrator, and the compound concentrator reflects the solar light toward the solid medium.

16. The plant of claim 14, further comprising:
a conveyor system located underground and in fluid communication with the storage tank,
a fluidized bed air heater located above ground, in fluid communication with the storage tank, and
an air compressor configured to generate compressed air,
wherein the conveyor system is configured to circulate the solid medium from a bottom of the storage tank to a top of the fluidized bed air heater using the compressed air.

17. The plant of claim 16, further comprising:
a heat exchange system having plural coils located inside the fluidized bed air heater, and another compressor that injects compressed air into the plural coils to remove heat from the solid medium.

18. The plant of claim 17, further comprising:
a power generation part that includes a set of steam turbines configured to generate electrical power based on the heat from the heated compressed air; and
a water distillation part configured to desalinate seawater based on steam from the set of steam turbines.

19. A method for generating electrical energy from solar power, the method comprising:
capturing solar light with a solar light capturing part;
heating a solid medium with the solar light reflected by a solar light capturing part, wherein the solid medium is stored underground, in a storage tank of a heat exchange part, and the solar light capturing part incudes a heliostat farm, a beam down solar concentrator, and a compound concentrator, each configured to reflect the solar light so that reflected light from the compound concentrator is directed to the solid medium to directly interact with the solid medium;
spreading the heat uniformly in the solid medium by moving the solid medium from a bottom of the storage tank to a top of the storage tank with a conveyor system;
transferring the heat from the solid medium to a liquid that flows through a coil located in the storage tank;
boiling water in a boiler, based on the heated liquid; and
generating the electrical energy with a turbine based on steam obtained by boiling the water.

20. The method of claim 19, further comprising:
reflecting with the heliostat farm a first light beam to the beam down solar concentrator;
reflecting with the beam down solar concentrator, which is located on top of a tower, above the heliostat farm, a second light beam, toward the compound concentrator; and
reflecting with the compound concentrator, located on the ground, a third light beam toward the solid medium,
wherein the second light beam is a reflection of the first light beam, and the third light beam is a reflection of the first light beam.

* * * * *